(12) United States Patent
Walsh et al.

(10) Patent No.: US 9,198,337 B2
(45) Date of Patent: Dec. 1, 2015

(54) IMPACT TOOL

(75) Inventors: Oliver Walsh, Galway (IE); Paul Walsh, Malahide (IE)

(73) Assignee: Easy Tool Limited, Galway (IE)

( * ) Notice: Subject to any disclaimer, the term of this patent is extended or adjusted under 35 U.S.C. 154(b) by 889 days.

(21) Appl. No.: 13/265,867

(22) PCT Filed: Apr. 21, 2010

(86) PCT No.: PCT/IE2010/000024
§ 371 (c)(1),
(2), (4) Date: Jan. 10, 2012

(87) PCT Pub. No.: WO2010/122539
PCT Pub. Date: Oct. 28, 2010

(65) Prior Publication Data
US 2012/0103644 A1    May 3, 2012

(30) Foreign Application Priority Data
Apr. 22, 2009    (IE) .................................... 2009/0315

(51) Int. Cl.
*B25D 1/16* (2006.01)
*A01B 1/02* (2006.01)
*B25G 1/04* (2006.01)

(52) U.S. Cl.
CPC . *A01B 1/026* (2013.01); *B25D 1/16* (2013.01); *B25G 1/04* (2013.01)

(58) Field of Classification Search
CPC ............. B25D 1/00; B25D 1/02; B25D 1/04; B25D 1/12; B25D 1/16; B25D 11/04; B25C 1/02; B25G 1/04
USPC ............... 173/90, 91, 132, 29, 202, 203, 131, 173/210; 294/51, 57, 53.5, 54.5; 30/169; 254/131.5
See application file for complete search history.

(56) References Cited

U.S. PATENT DOCUMENTS 2,587,944 A * 3/1952 Williams ...................... 173/115
3,071,994 A * 1/1963 Swenson ...................... 173/121

(Continued)

FOREIGN PATENT DOCUMENTS

DE    19901047    7/2000
GB    561688    5/1944

OTHER PUBLICATIONS

International Search Report of the Authorized Searching Authority (corresponding to Application: PCT/IE2010/000024); European Patent Office; Authorized Officer Jovanka Prelovac; Issued Jul. 27, 2010; (3 pages).

*Primary Examiner* — Scott A. Smith
(74) *Attorney, Agent, or Firm* — Benesch, Friedlander, Coplan & Aronoff, LLP

(57) ABSTRACT

A tool body (1) has a coupler for engagement with any of a variety of tool heads such as a spade head (3), and a hatchet head (4). A tool comprising the body (1) and a tool head (3-10) is a hammer action tool. It may be used as a fork, spade, chisel, hatchet, or any tool which would benefit from a hammer action. A tubular shank (21) and a hammer (22) are together a hammer weight which is pushed down by the user until it hits a receiver (23), driving the tool head. A spring (24) returns the hammer (22) and a shank (21) back up to the start position ready for the next hammer action. It also acts to push the tool head out against a work surface for overhead work such as chiseling. A spring (25), acting between a hammer impact part (22) and the handle (21, 27) takes the shock out of the impact for the user's hands. The shank (21) and the hammer (22) slide up and down together on the box-section receiver tube (32). A safety locking mechanism has a catch (30) biased to automatically lock the hammer unless the user presses a trigger in the handle.

28 Claims, 11 Drawing Sheets

(56) References Cited

U.S. PATENT DOCUMENTS

| | | | | |
|---|---|---|---|---|
| 3,117,378 A | * | 1/1964 | Bowen | 33/293 |
| 3,483,727 A | * | 12/1969 | Giannetto | 72/429 |
| 3,519,087 A | * | 7/1970 | Santi | 173/91 |
| 3,735,822 A | | 5/1973 | Deike | |
| 3,747,690 A | * | 7/1973 | Deike | 173/118 |
| 3,792,739 A | | 2/1974 | Deike | |
| 3,993,340 A | * | 11/1976 | Rusing et al. | 294/53.5 |
| 4,316,513 A | * | 2/1982 | Harris | 173/91 |
| 4,470,440 A | | 9/1984 | Thor | |
| 4,691,954 A | * | 9/1987 | Shaud | 294/54.5 |
| 5,097,912 A | * | 3/1992 | Bowers | 173/90 |
| 5,398,773 A | * | 3/1995 | Baker | 173/90 |
| 5,495,878 A | * | 3/1996 | McKenen, Jr. | 144/195.5 |
| 5,542,479 A | * | 8/1996 | Stachler et al. | 173/90 |
| 5,605,271 A | * | 2/1997 | Russell | 227/147 |
| 5,810,333 A | * | 9/1998 | Hickerson et al. | 254/93 R |
| 5,816,634 A | * | 10/1998 | Jacobs et al. | 294/57 |
| 6,347,672 B1 | * | 2/2002 | Reardon | 173/90 |
| 6,792,829 B2 | * | 9/2004 | Garcia et al. | 81/45 |
| 7,303,027 B1 | * | 12/2007 | Laemmer | 173/91 |
| 7,325,625 B1 | * | 2/2008 | Winters | 173/90 |
| 7,581,771 B2 | * | 9/2009 | Rosine et al. | 294/54.5 |
| 8,327,516 B2 | * | 12/2012 | Kliskey | 29/275 |
| 2004/0108121 A1 | | 6/2004 | Lowther | |

* cited by examiner

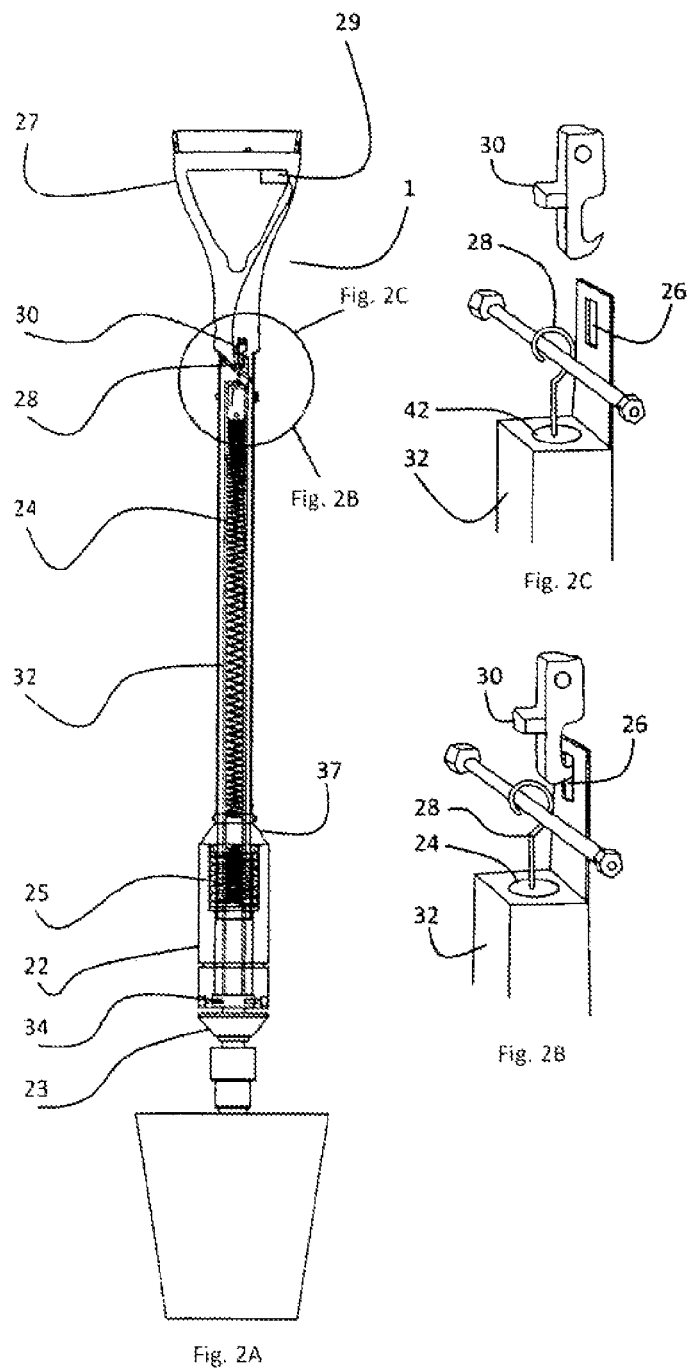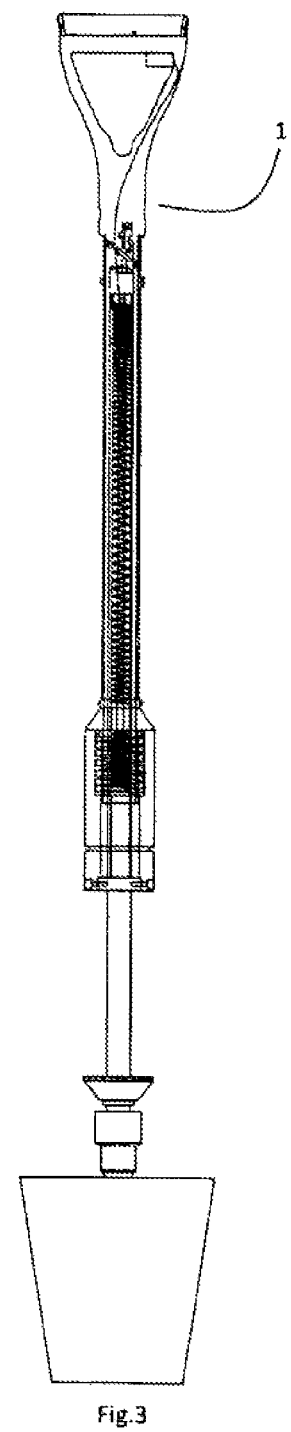
Fig. 2A
Fig. 2C
Fig. 2B
Fig. 3

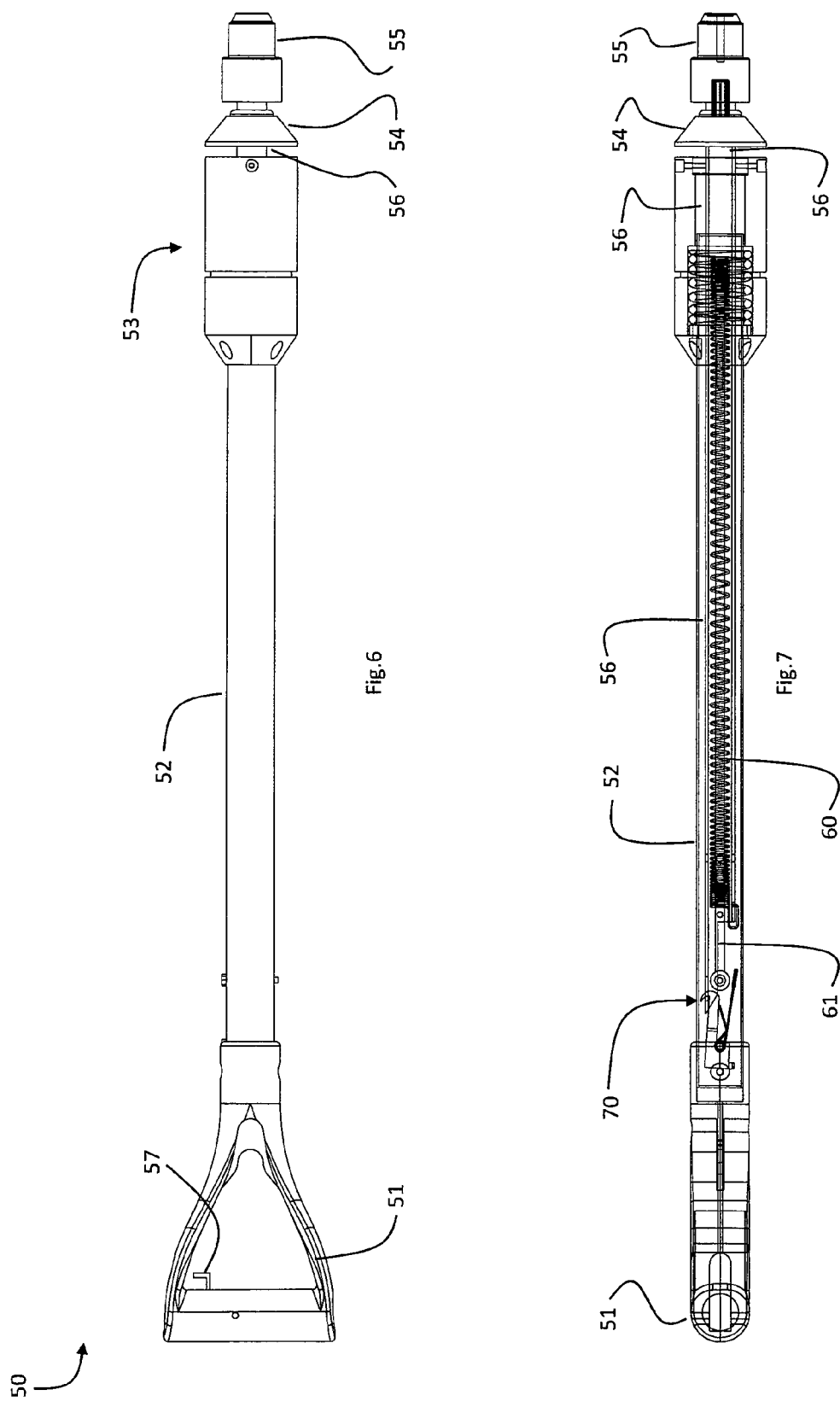

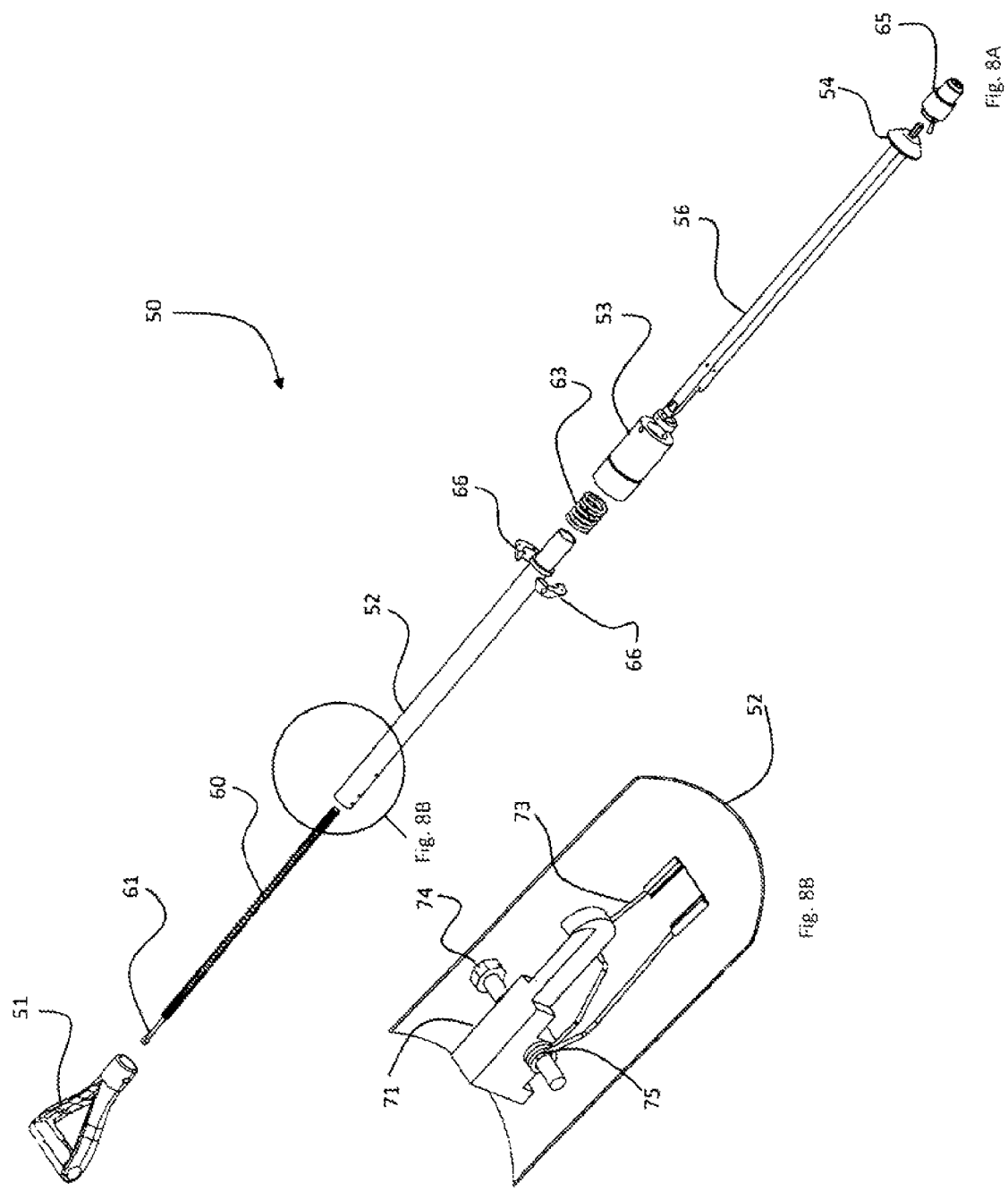

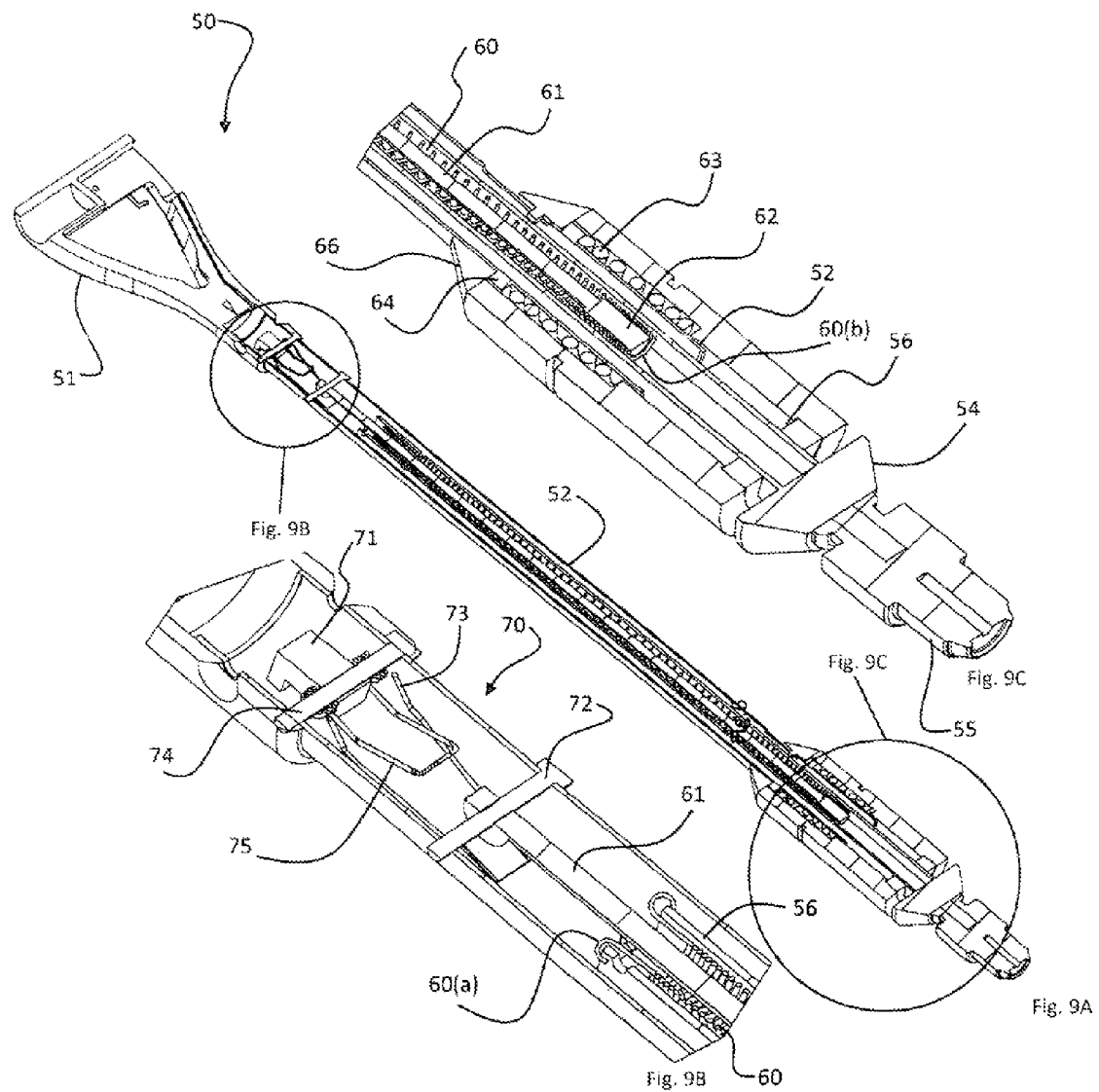

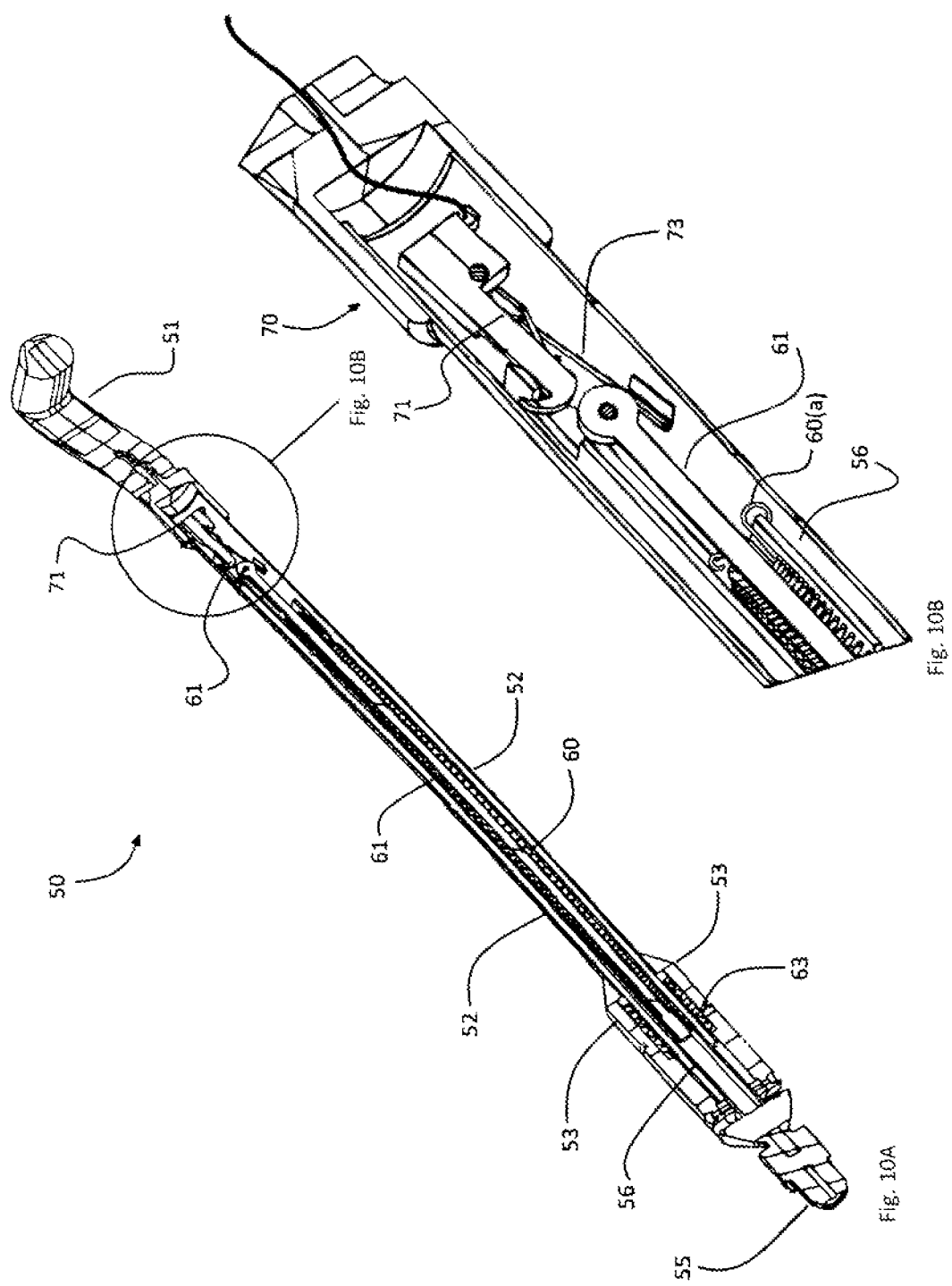

ents.
IMPACT TOOL

The invention relates to tools, DE19901047 describes a chisel having a tubular housing through which the chisel head extends.

U.S. Pat. No. 3,735,822 describes a manually actuated jack hammer with a recoil spring to establish a systematic rhythm for repeated impact blows.

An object of the invention is to provide improved effectiveness of tools, particularly manual tools without electrical power.

SUMMARY OF THE INVENTION

According to the invention, there is provided a tool body comprising:
a handle,
a shank,
a tool head or a coupler for a tool head,
a hammer having a hammer part for impact,
a receiver, and
a spring for biasing the hammer to an upper operative position ready for use and for biasing the hammer receiver to an outer operative position.

In one embodiment, the return spring has sufficient strength to support the hammer in an operative position without user lifting.

In one embodiment, the return spring has sufficient strength to support the socket or tool head in an operative position when pointed overhead.

In one embodiment, the spring is extended in the hammer impact position.

In one embodiment, the spring is located within the shank.

In one embodiment, the receiver comprises a flange for impact with the hammer, and an elongate member protruding upwardly within the shank.

In another embodiment, the receiver elongate member is engaged with the return spring.

In one embodiment, a top end of the return spring engages the receiver elongate member.

In another embodiment, the hammer is connected to the return spring by a rod which is connected to the shank and extends into the receiver elongate member.

In one embodiment, the return spring is a coil spring through which the rod extends and a lower end of the return spring is engaged with the rod.

In one embodiment, the return spring is closed over a lower end of the rod.

In one embodiment, the tool body further comprises a locking mechanism for locking the hammer down.

In one embodiment, the mechanism is operated by pulling a trigger in the handle.

In one embodiment, a biased catch engages in a slot to lock the hammer.

In a further embodiment, the locking mechanism has a default locked position.

In one embodiment, the tool body further comprising a shock-absorbing spring.

In one embodiment, the shock-absorbing spring is within the hammer.

In one embodiment, the shock absorbing spring extends between the shank and the hammer part for impact with the receiver.

In one embodiment, the hammer part is cylindrical, surrounding the shank.

In a further embodiment, the hammer is slides on and surrounds an elongate tube secured to the receiver.

In one embodiment, the tool further comprises means for adding weight to the hammer.

In one embodiment, the weight means comprises cylindrical sectors having features for engagement with the hammer when they surround the hammer.

In one embodiment, the features include a ridge and a groove.

In one embodiment, the tool body comprises a coupler for a tool head, the coupler comprising a hollow tube having and a catch in a side wall for engaging with a tool head inserted into the tube.

In one embodiment, the tube is shaped to receive a tool head at any of a plurality of orientations.

In another aspect, the invention provides a tool comprising a tool head and a tool body as defined above in any embodiment.

In one embodiment, the tool head comprises a shank shaped to fit within said tube and has a recess for engagement with the catch.

In one embodiment, the tool head shank has a plurality of recesses for engagement with the catch, to provide different tool head orientations.

DETAILED DESCRIPTION OF THE INVENTION

The invention will be more clearly understood from the following description of some embodiments thereof, given by way of example only with reference to the accompanying drawings in which:

FIG. 1 is a front view of a tool body showing various heads which may be coupled to it and additional weights which can be added to the hammer head when required;

FIGS. 2A-C and 3 are cross-sectional sketches showing the tool body in compacted and extended positions, and FIGS. 2B and 2C are two detailed views showing locked and unlocked tool positions;

FIG. 6 is a side view of a tool body of an alternative embodiment,

FIG. 7 shows the internal parts of this tool body, FIGS. 8A and B are exploded views, FIGS. 9A-C and 10A-B are a set of cut-away section views.

Figure 1:
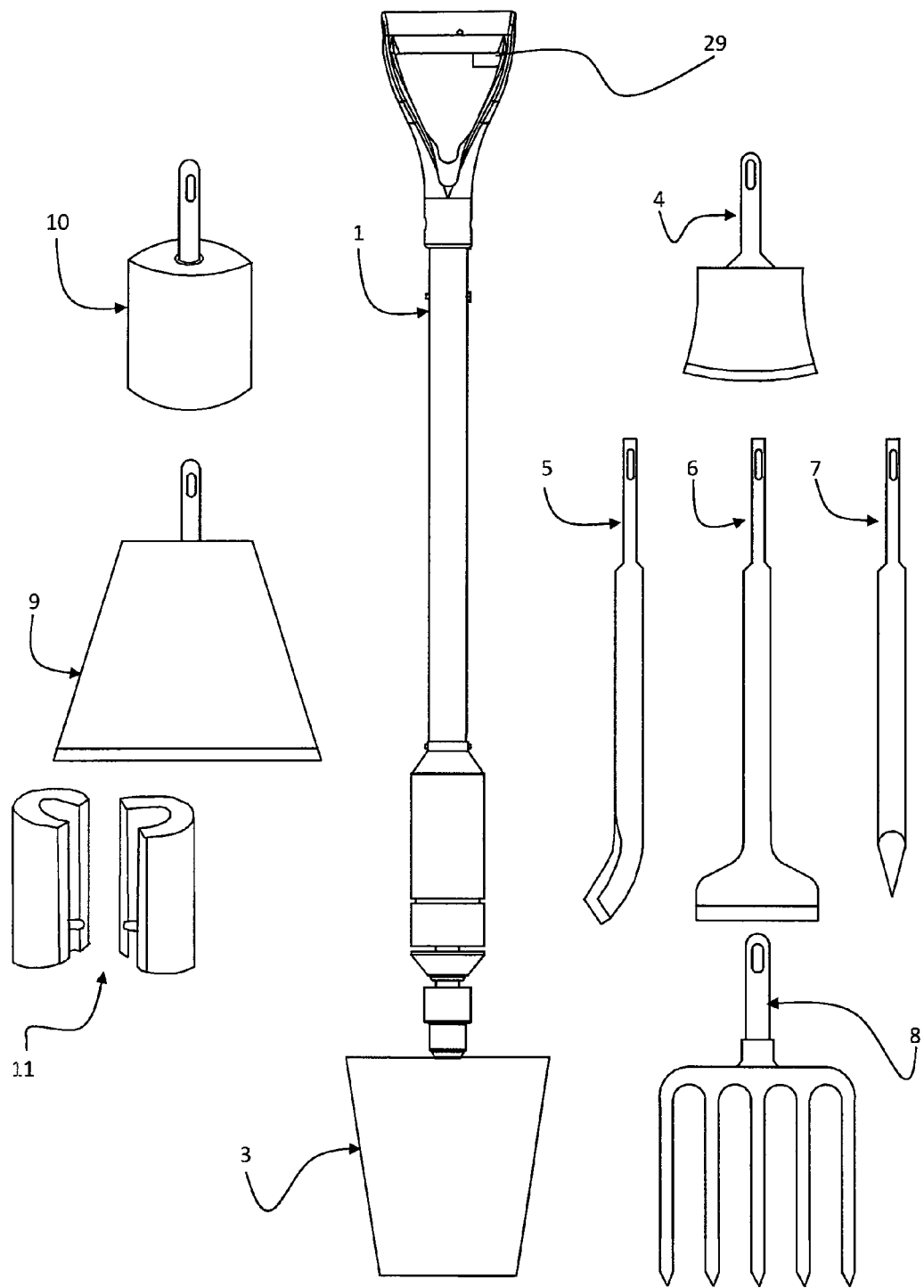
Figure 4:
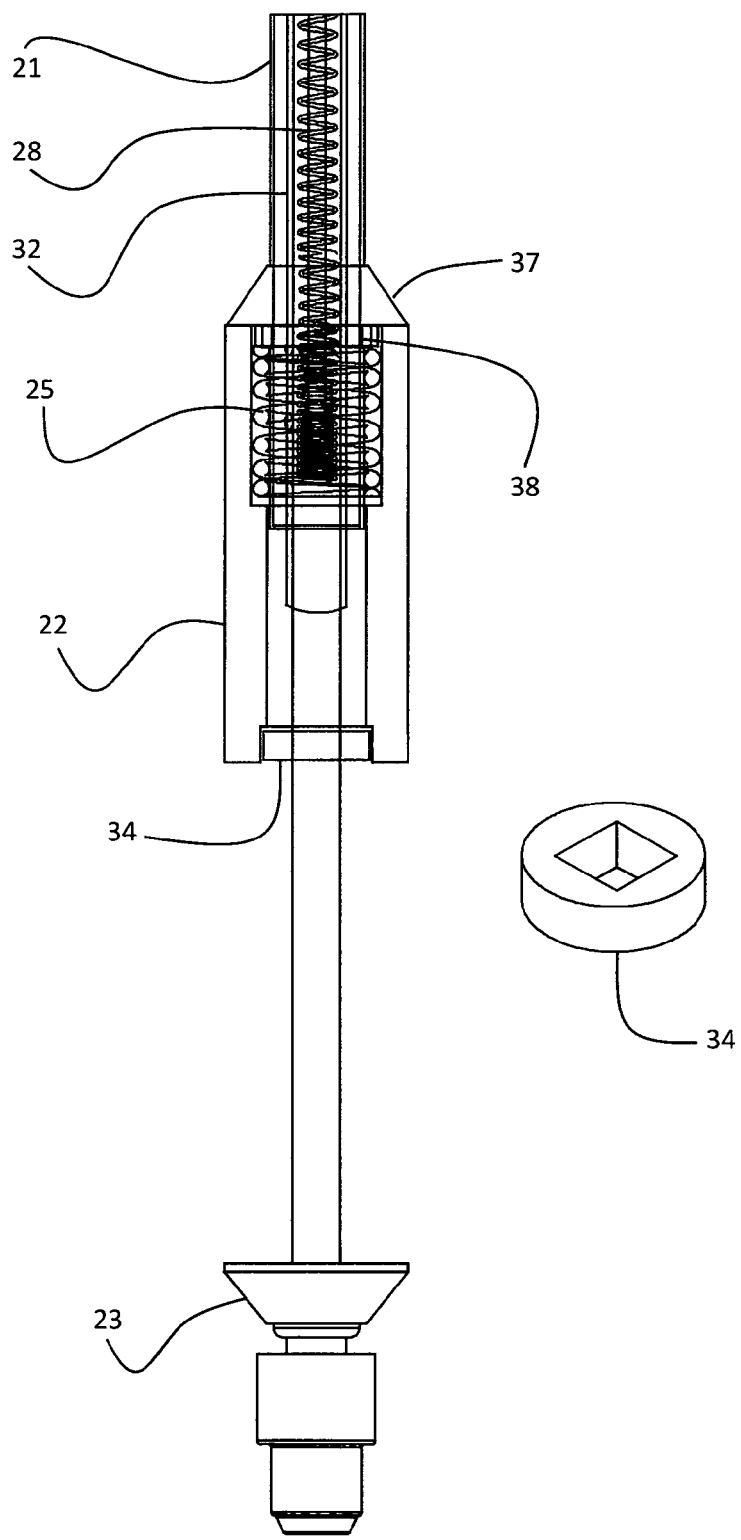
FIG. 4 is a more detailed cross-sectional view showing a base of the body.
Figure 5:
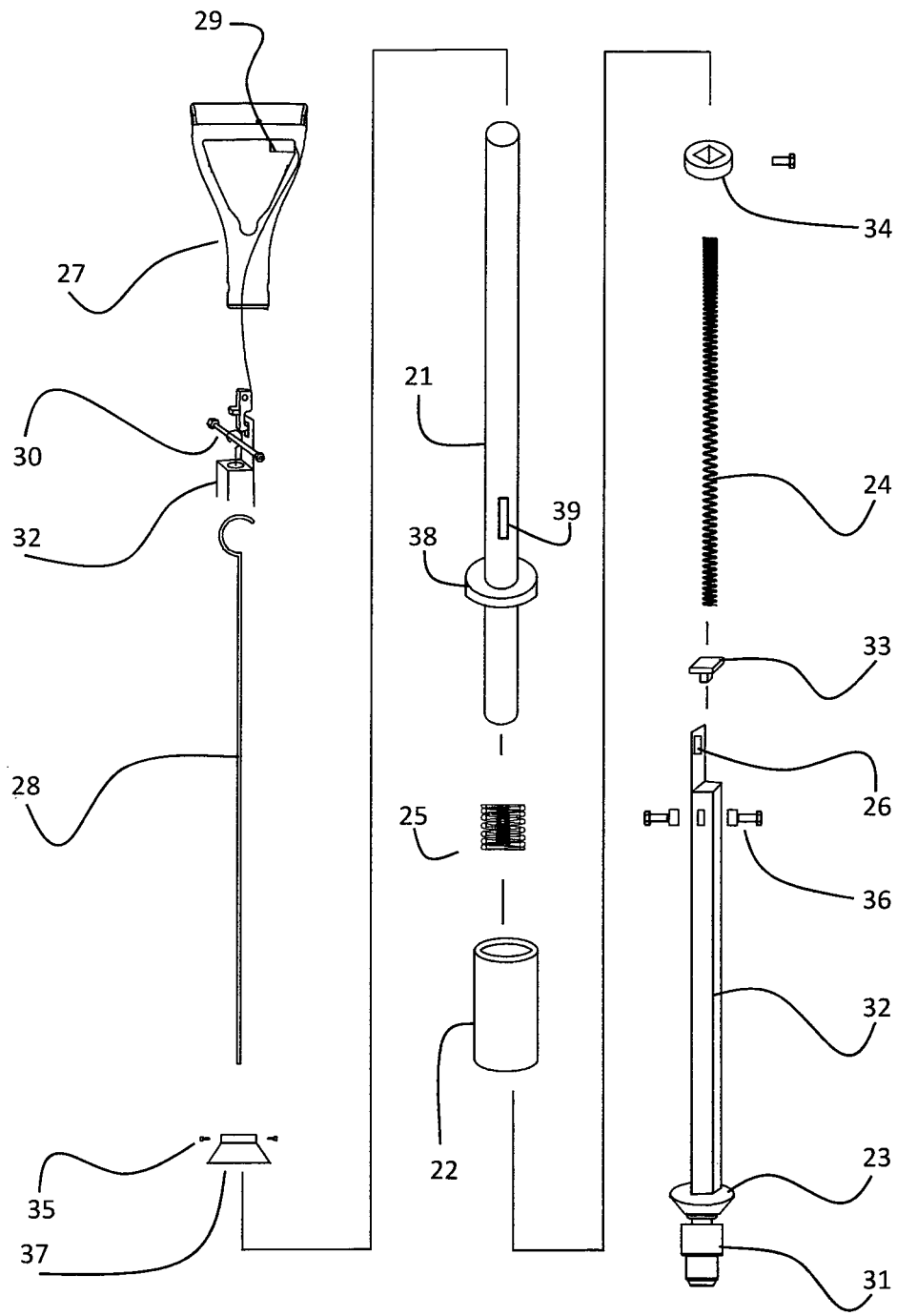
FIG. 5 is an exploded view showing in more detail the parts of the tool body.

Referring to FIG. 1 a tool body 1 has a coupler for engagement with any of a variety of tool heads such as a spade head 3, a hatchet head 4, a chaser head 5, an flat head chisel 6, a point chisel head 7, a fork head 8, scraper head 9 and hard rubber head 10. This drawing shows a pair of additional weights 11 for addition to a hammer for changing the hammer weight when desired.

The manner of coupling the tool head to the tool body 1 is not the subject of the invention and is known in the art. It involves using a chuck 31 of the known "SDS" type.

Referring now to FIGS. 2A to 5, the tool body 1 comprises:
21, hollow shank around which there is a steel washer 38 which is a contact point for a shock-absorbing spring 25;
22, sleeve-shaped hammer;
23, receiver for hammer action;
24, return spring;
25, shock-absorbing spring;

26, locking slot (on top of box section 32 to accept locking hook);
27, handle;
28, rod (push rod for return spring), connected between the shank 21 and the bottom of the return spring 24;
29, trigger and pull cable;
30, safety locking mechanism;
31, chuck;
32, receiver tube (square box section, fixed to the hammer receiver 23);
33, guide bearing fitting into the top of receiver tube 32 for sliding contact with the inside of the shank 21;
34, guide bearing at base of the hammer 22 for sliding on the receiver tube 32;
35, stop screw;
36, screws and stop block;
37, collar for connecting shank 21 to hammer 22;
38, washer fixed to shank 21, for pressing against the shock absorbing spring 25;
39, slot for screw stop.

The sliding hammer unit is stopped from coming apart from the receiver unit 32, 23 by the screws 35 in the collar 37, which goes through the slot 39 in the shank 21 and stops when the screw 35 hits the stop 36 at the top of the receiver box 32.

A tool comprising the body 1 and a tool head (any of items 3 to 10 for example) is a hammer action tool. It may be used as a fork, spade, chisel, hatchet, or any tool which would benefit from a hammer action. The chuck 31 allows for quick change of tools and will accept all existing "SDS" tools. Items 11 shown FIG. 1 can be attached to the hammer 22 where extra weight is required.

The tubular shank 21 and the hammer 22 are together a hammer weight which is pushed down by the user until it hits the receiver 23/32, driving the tool head. The spring 24 returns the hammer 22 and the shank 21 back up to the start position ready for the next hammer action. The spring 25 takes the shock out of the impact for the user's hands, as it is between the shank 21 and the hammer 22.

The shank 21 and the hammer 22 slide up and down together on the box-section receiver tube 32.). The bearing 34 is at the base of the hammer 22 and the bearing 33 is at the top of the receiver tube 32. The sliding action is kept smooth with the two plastics bearings 33 and 34 as these slide on the surfaces of the shank 21 (inside) and the receiver tube 32 (outside Thus, the tool body 1 comprises two mutually sliding units, namely the receiver 32/23 which may be regarded as fixed for visualisation purposes, and the hammer weight 21/22 unit which slides on the receiver tube 32. These two units are interconnected by the return spring 24, which is anchored to the receiver unit 32/23 at the top of the receiver tube 32 and to the hammer unit 21/22 at the bottom of the rod 28 (fixed by the bolt 30 to the shank 21). The user action of pushing the shank 21 down is against bias of the return spring 24. Upon impact of the hammer 22 with the receiver 23, the shaft 21 continues to slide relative to the hammer 22 within the small extent allowed by the spring 25 for shock absorption. The sequence of links between the receiver 23 and the handle 27 is as follows: receiver 23 and integral receiver tube 32, top of return spring 24, bottom of return spring 24, bottom of rod 28, top of rod 28, shank 21, handle 27. Because this sequence includes the spring, the user's pressing down of the handle and hence of the hammer is against bias of the return spring 24, causing it to extend. Then, upon impact of the hammer 22 with the receiver 23 the extended return spring pulls the handle and all of the hammer unit back up to be ready for the next stroke.

It will be appreciated that the main role of the rod is simply to extend the return spring 24 so that it can operate to push the hammer back as it contracts again and if the tool is directed upwardly, the return spring also acts to push the tool head up against a work surface. This is particularly suitable for chiselling. Hence the return spring simply tends to push the tool head and the handle apart, thus providing these two important actions at the same time.

The hammer 22 combined with the shank 21 locks down when the locking device 30 comes in contact with the locking slot 26 and is released when the trigger 29 is pulled. FIG. 2B shows the locking position and FIG. 2A shows the released position. In the locking position the receiver and hammer units are connected together, preventing them from mutually sliding and hence preventing the hammer action.

To use the hammer action, the trigger 29 must be held in the pulled position. When the trigger 29 is released the hammer action will automatically lock for safety. The return spring 24 pressure keeps the catch 30 locked engaging the locking slot 26. This is a safety feature to ensure that the device doesn't accidentally expand. To unlock, one presses the trigger by compresses the handle to allow the catch 30 clearance from locking slot 26. When compressed, the trigger 29 must then be depressed to release the catch 30. The device will then expand. The trigger 29 must remain depressed for continued hammer action use. Once the trigger 29 is released the catch 30 will automatically lock with the locking slot 26 as the handle is pressed down.

For safety, the handle must be pushed down in order to pull the trigger and release the hammer, because the spring 24 is keeping pressure on the locking device hook.

The tool body 21 provides for very effective action in any situation where a hammer action is desirable. The spring 24 is very effective for returning the hammer to the hammering position, because when one pushes down on the handle, the spring 24 expands and wants to return back to its normal position. The spring 25, importantly, avoids impact shock in the user's hands. This is achieved by the washer 38 on the shank 21 acting against the spring 25 which acts against the hammer 22. This means that when operating the handle there is no direct contact with the hammer 22. The shock absorbing spring 25 acts as a buffer between the hammer 22 and the shank 21/handle 27.

As well as lifting the handle up, the spring 24 also pushes the tool head out in the opposite direction. For example, when using the device for chiselling a wall in the overhead position the spring 24 pushes the tool head against the work surface, which means that the chisel point is held in position and one can strike the same point every time. This is particularly advantageous.

Referring to FIGS. 7 to 11 an alternative tool body 50 is shown. This differs from that of FIGS. 1 to 6 only in minor details. It comprises a handle 51, a shank 52, a hammer 53, a receiver 54, a chuck 55, and a receiver tube 56. There is a return spring 60, a rod 61, an enlarged portion 62 of the rod for engagement with the return spring 24, a shock-absorbing spring 63, and a flange 64 for engaging the shock-absorbing spring 63. A locking mechanism 70 comprises a catch 71 pivoting on a bolt 74 and the catch 71 being biased by a torsion spring 75 having a rear portion 73 pressing against the inner surface of the shank 52 and a bolt 72 for the rod 61. The arrangement of the torsion spring 75 provides very effective locking of the tool body. A bolt 72 connects the rod 61 to the shank 52, bypassing through the shank 52 and an eye in the top of the rod 61. There is a locking mechanism trigger 57, linked to the catch 71 by a cable 58. The top of the spring 60 is connected to the top of the receiver tube 56 by hooks 60(a).

The bottom of the spring 60 is secured to the bottom of the rod 61 because is closed over the end of the rod at 60(*b*).

Instead of a bearing member such as the bearing 33 of FIGS. 1 to 6, in this embodiment the top of the receiver tube 56 has a rubber pad on each of the four sides for rubbing against the inside of the shank 52 (best shown in FIG. 8A). The manner in which the shock absorption occurs is shown most clearly in FIGS. 9A-C, in which it is seen that a flange 64 presses against the shock absorbing spring 63, the lower end of which presses against a ledge within the hammer 53. This provides a very effective shock-absorbing resilient link within the hammer unit.

Figure 11:
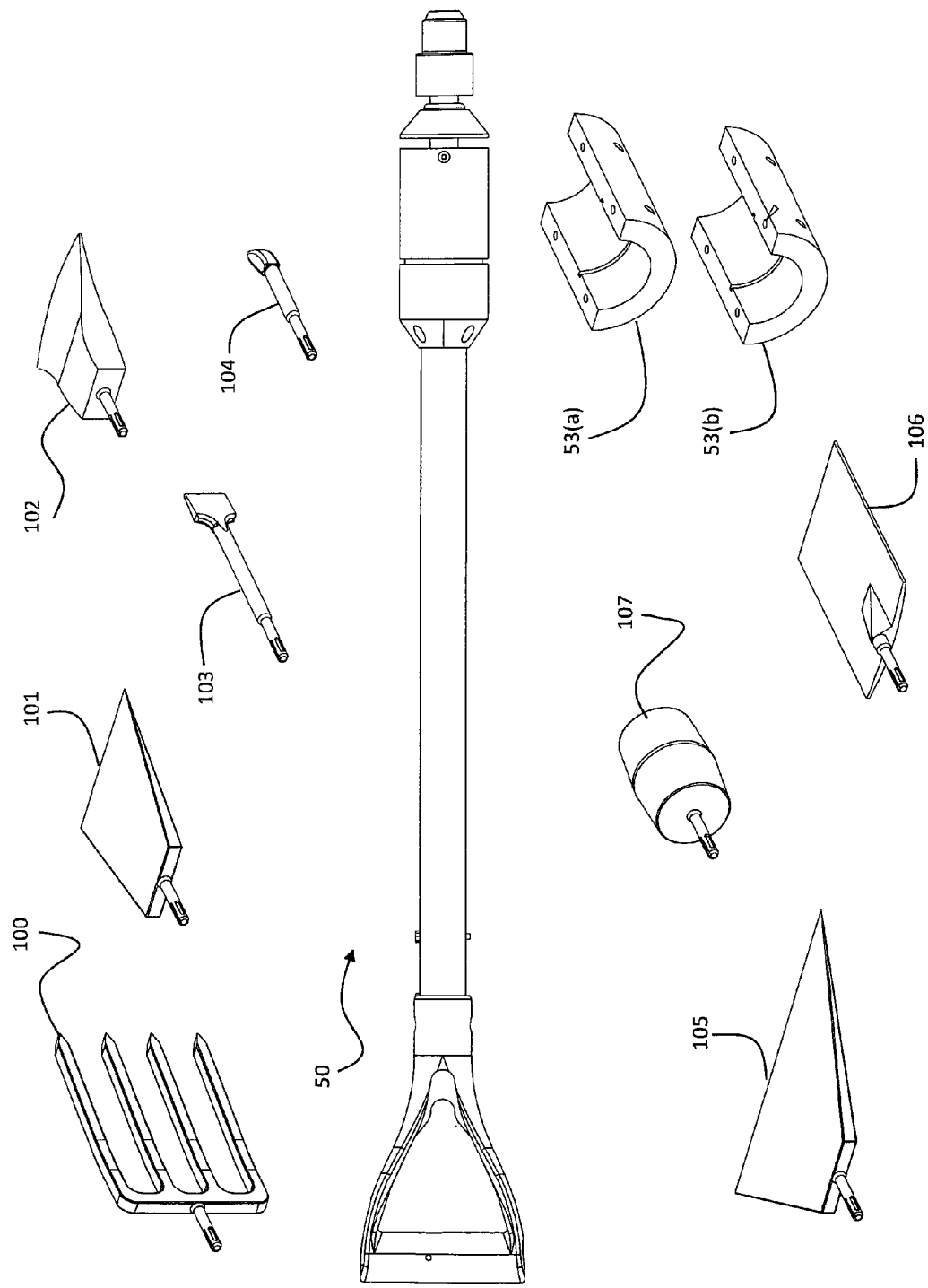
FIG. 11 is a view showing a variety of tool heads which could be used with the tool body.

As shown in FIG. 11 the tool body 50 may be used with a range of tool heads, such as a fork head 100, chisel heads 101, 103, and 104, a hatchet 102, a scraper 105, spade 106, and a rubber head for tapping down slabs. This drawing also shows additional weights 53(*a*) and 53(*b*) for the hammer, each having an internal annular male ridge for engaging an annular slot in the hammer.

Figure 12:
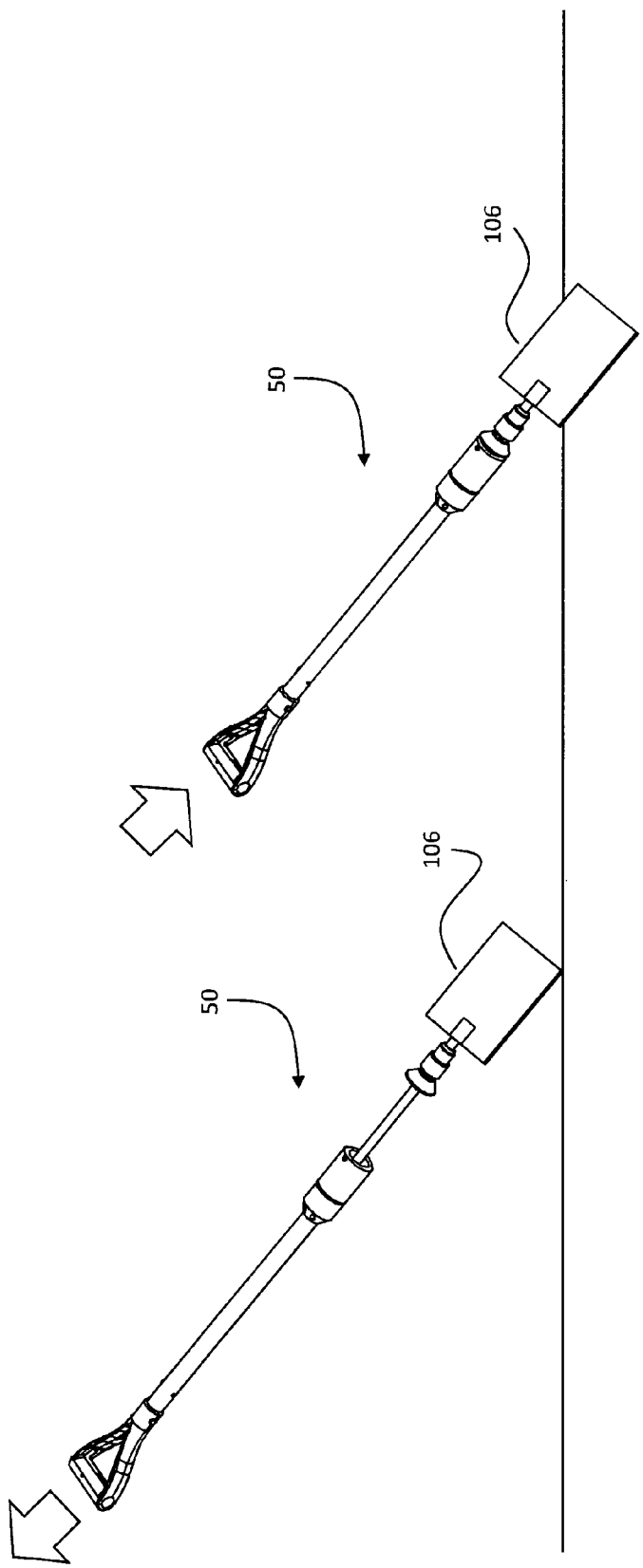
FIG. 12 shows a tool in use.

FIG. 12 shows the tool in use, the user pushing the handle down to cause an impact on the tool head.

Figures 13, 14:
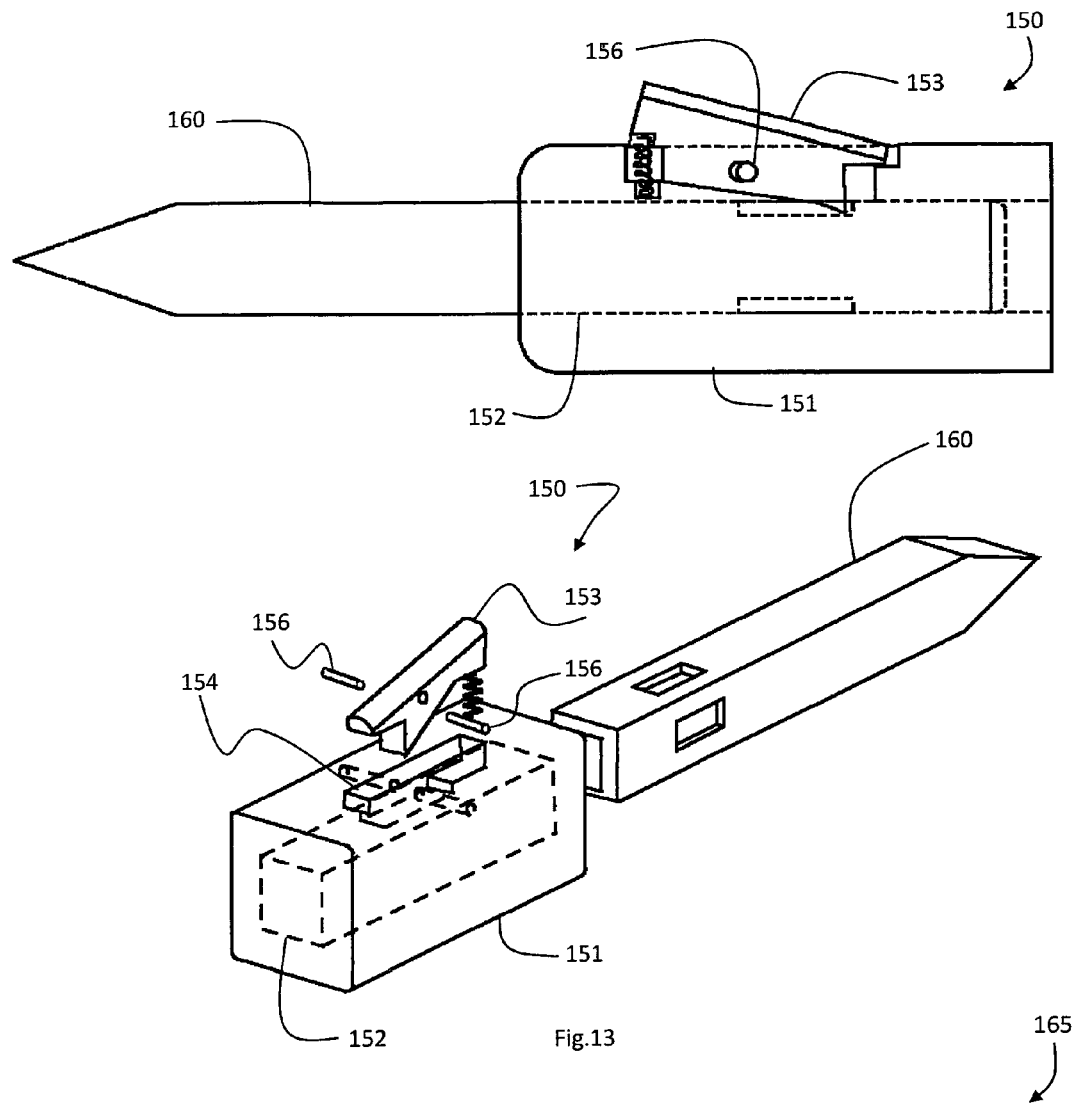
FIGS. 13 and 14 show alternative chucks for connection to a tool head.

Referring to FIG. 13 an alternative chuck, 150, is shown. This comprises a square-section tube 151 with a thick wall, providing a socket 152 for receiving a tool head 160. A catch 153 is engaged in a recess 154 and is held in place by a pin 156 extending through both the tube 151 and the catch 153. The catch 153 is biased by a spring 157 to be ready to snap fit into engagement with the tool head 160.

FIG. 14 shows a variation in which a socket 165 has a cylindrical tube 174, with a recess 175 to receive a catch 172 pivoting on a pin 173 and being biased by a spring 171.

The invention is not limited to the embodiments described but may be varied in construction and detail. For example the tool head may be directly secured to or be an integral part of the tool body without a coupler. The return spring may comprise a plurality of individual springs acting in concert, such as concentric coil springs or a combination of a coil spring and a leaf spring for example.

The invention claimed is:

1. A tool body comprising:
   a handle,
   a shank,
   a tool head,
   a hammer having a hammer part for impact,
   a receiver operable to drive the tool head upon the impact of the hammer, wherein the receiver comprises an elongate member protruding upwardly within the shank, and
   a return spring for biasing the hammer to an upper operative position and for biasing the hammer receiver to an outer operative position, wherein the hammer is connected to the return spring by a rod which is connected to the shank and extends into the elongate member of the receiver.

2. The tool body of claim 1, wherein the return spring has sufficient strength to support the hammer in an operative position.

3. The tool body of claim 1, wherein the return spring has sufficient strength to support the tool head in an operative position when pointed overhead.

4. The tool body of claim 1, wherein the return spring is extended in a hammer impact position.

5. The tool body of claim 4, wherein the return spring is located within the shank.

6. The tool body of claim 1, wherein the elongate member of the receiver protrudes upwardly within the shank and the receiver comprises a flange for impact with the hammer, and any one of the following:

(a) the return spring is of sufficient strength to support the tool head in an operative position when pointed overhead;
   (b) the return spring is of sufficient strength to support any of the following: (a) the hammer in an operative position; or (b) the tool head in an operative position when pointed overhead, and the return spring is extended in a hammer impact position; or
   (c) the return spring is of sufficient strength to support any of the following: (a) the hammer in an operative position; or (b) the tool head in an operative position when pointed overhead, and the return spring is extended in a hammer impact position and is located within the shank.

7. The tool body of claim 6, wherein the receiver elongate member is engaged with the return spring.

8. The tool body of claim 7, wherein a top end of the return spring engages the receiver elongate member.

9. The tool body of claim 1, wherein the return spring is a coil spring through which the rod extends and a lower end of the return spring is engaged with the rod.

10. The tool body of claim 9, wherein the return spring is closed over a lower end of the rod.

11. The tool body of claim 1, further comprising a locking mechanism for locking the hammer down.

12. The tool body of claim 11, wherein the locking mechanism is operated by pulling a trigger in the handle.

13. The tool body of claim 11, wherein the locking mechanism includes a biased catch that engages in a slot to lock the hammer.

14. The tool body of claim 11, wherein the locking mechanism has a default locked position.

15. The tool body of claim 11, further comprising a shock-absorbing spring.

16. The tool body of claim 15, wherein the shock-absorbing spring is within the hammer.

17. The tool body of claim 16, wherein the shock absorbing spring extends between the shank and the hammer part for impact with the receiver.

18. The tool body of claim 17, wherein the hammer part is cylindrical, surrounding the shank.

19. The tool body of claim 1, wherein the hammer slides on and surrounds an elongate tube secured to the receiver.

20. The tool body of claim 1, further comprising means for adding weight to the hammer.

21. The tool body of claim 20, wherein the weight means comprises cylindrical sectors having features for engagement with the hammer when they surround the hammer.

22. The tool body of claim 21, wherein the features include a ridge and a groove.

23. The tool body of claim 1, comprising a coupler for a tool head, the coupler comprising a hollow tube having a catch in a side wall for engaging with a tool head inserted into the tube.

24. The tool body of claim 23, wherein the tube is shaped to receive a tool head at any of a plurality of orientations.

25. The tool body of claim 23, wherein the tool head comprises a shank shaped to fit within said tube and has a recess for engagement with the catch.

26. The tool body of claim 25, wherein the tool head shank has a plurality of recesses for engagement with the catch, to provide different tool head orientations.

27. A tool body comprising:
   a handle,
   a shank,
   a coupler for a tool head, said coupler comprising a hollow tube having a catch in a side wall for engaging with a tool head inserted into the tube, a hammer having a hammer part for impact,
a receiver comprising an elongate member, and
a return spring for biasing the hammer to an upper operative position and for biasing the hammer receiver to an outer operative position, wherein the hammer is connected to the return spring by a rod which is connected to the shank and extends into the elongate member of the receiver.

28. The tool body of claim 27, wherein the return spring has sufficient strength to support a socket in an operative position when pointed overhead.

* * * * *